United States Patent
Zhao et al.

(10) Patent No.: US 8,181,055 B2
(45) Date of Patent: May 15, 2012

(54) APPLYING POWER TO A NETWORK INTERFACE

(75) Inventors: Yu Zhao, Singapore (SG); Lin Rong Bao, Singapore (SG); Kuan Chum Raymond Oei, Singapore (SG); Gim Sian Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 12/381,105

(22) Filed: Mar. 6, 2009

(65) Prior Publication Data

US 2010/0229009 A1    Sep. 9, 2010

(51) Int. Cl.
G06F 1/26 (2006.01)
(52) U.S. Cl. ......................... 713/340; 713/323
(58) Field of Classification Search ............. 713/323, 713/340
See application file for complete search history.

(56) References Cited

U.S. PATENT DOCUMENTS

| | | | |
|---|---|---|---|
| 5,862,437 A | 1/1999 | Kutsuwada et al. | |
| 6,092,207 A | 7/2000 | Kolinski | |
| 6,334,719 B1 | 1/2002 | Kimura | |
| 6,408,148 B1 | 6/2002 | Yamamoto | |
| 6,480,401 B2 | 11/2002 | Tang | |
| 6,727,952 B1 | 4/2004 | Hirata et al. | |
| 6,760,850 B1 * | 7/2004 | Atkinson et al. | 713/320 |
| 6,901,523 B2 | 5/2005 | Verdun | |
| 7,044,571 B2 | 5/2006 | Smith et al. | |
| 7,058,823 B2 | 6/2006 | Lapidus | |
| 7,073,077 B1 | 7/2006 | Gavlik | |
| 7,392,412 B1 * | 6/2008 | Lo | 713/320 |
| 7,454,641 B2 * | 11/2008 | Connor et al. | 713/324 |
| 7,689,852 B2 * | 3/2010 | Hwang et al. | 713/340 |
| 2002/0126516 A1 | 9/2002 | Jeon | |
| 2002/0188875 A1 * | 12/2002 | Hwang et al. | 713/300 |
| 2008/0155290 A1 | 6/2008 | Kanzawa | |

FOREIGN PATENT DOCUMENTS

| | | |
|---|---|---|
| JP | 07186492 | 7/1995 |
| JP | 2001005350 | 1/2001 |
| JP | 2001037222 | 2/2001 |
| JP | 2002370430 | 12/2002 |

OTHER PUBLICATIONS

Intel Technical Brief, Intel® Centrino® Mobile Technology Wake on Wireless LAN (WoWLAN) Feature, Intel Corporation, 2006, 6 pages.

AMD White Paper, "Magic Packet Technology", Advanced Micro Devices, Inc., Publication No. 20213, Revision A, Nov. 1995, 6 pages.

Lieberman Software White Paper, "Wake on LAN Technology", Lieberman Software Corporation, Revision 2, Jun. 1, 2006, 9 pages.

"TL431/TL431A Programmable Shunt Regulator", Fairchild Semiconductor Corporation, Revision 1.0.3, Aug. 4, 2003, 10 pages.

Lee, JunBae, "High Input Voltage, Off-Line Flyback Switching Power Supply Using FSC 1GBT (SGL5N150UF)", Fairchild Semiconductor Corporation, No. AN9011, Jul. 2000, 9 pages.

* cited by examiner

Primary Examiner — Thuan Du

(57) ABSTRACT

A host device capable of communicating with an external network. The host device may comprise a power-application unit and a network interface. The power-application unit may receive from a power-supply unit a first power-supply output having a first voltage level and a second power-supply output having a second voltage level. The power-application unit may be controllable for producing selectively a first power-application output having a third voltage level from the first power-supply output and a second power-application output having a fourth voltage level from the second power-supply output. The network interface may transmit data to and receive data from an external network, and may be powered at least in part by the first and second power-application outputs.

12 Claims, 3 Drawing Sheets

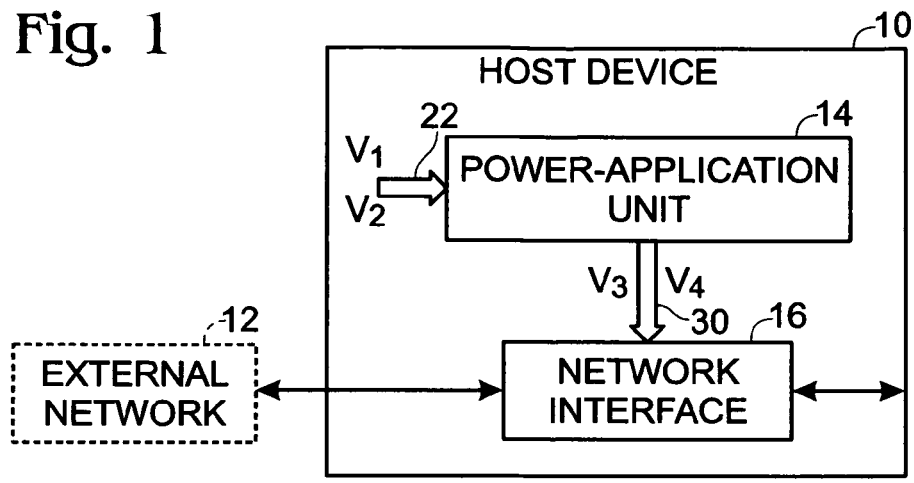
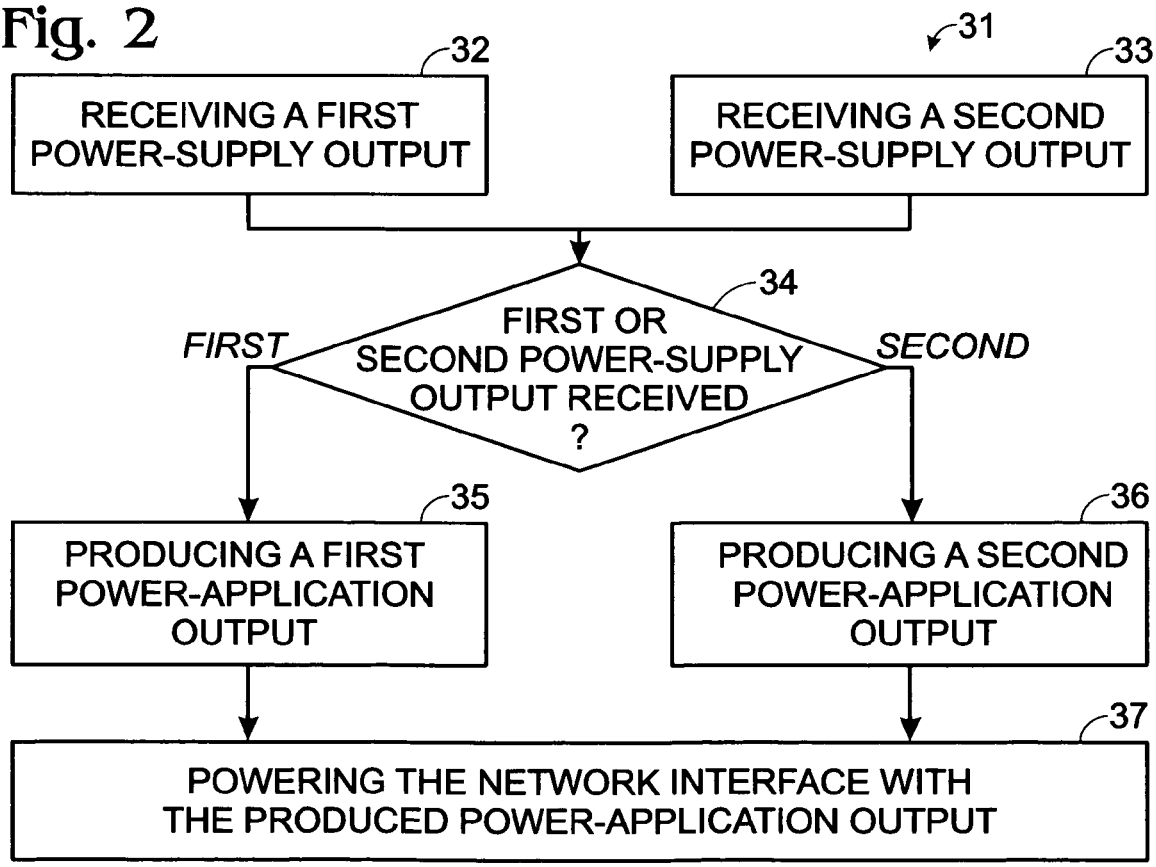

APPLYING POWER TO A NETWORK INTERFACE

BACKGROUND

With the increasing awareness of world energy shortage and increasing energy prices, consumers are increasingly concerned about the environment and the environmental impacts of their purchases and use of electrically powered products. As a result, energy-consuming products, and electronic products in particular are increasingly being made to operate with improved energy efficiency, made possible in part by the use of standby and off power modes. Many electronic products that are connected to a power source continue to consume power even though some or all functions are not being used.

Both voluntary and mandatory power-regulation standards have forced manufacturers to meet minimum power-efficiency standards or risk losing customers—and, sometimes, markets. New versions of standards and new mandatory governmental regulations call for higher efficiencies. For example, a joint effort by the US Environmental Protection Agency and the US Department of Energy provides a voluntary-compliance program under the service mark ENERGY STAR® related to its promotion of energy conservation and the production of energy-efficient products. Individual states and other countries now also have regulations regarding energy use of products. These regulations are becoming more stringent and commercially affect the consumption of power by operating devices, including the consumption of power in reduced-power modes such as standby, sleep and off modes of operation.

BRIEF DESCRIPTION OF THE DRAWINGS

Features and advantages of embodiments of the present disclosure will become apparent by reference to the following detailed description and drawings. For the sake of brevity, reference numerals or features having a previously described function may not necessarily be described in connection with other drawings in which they appear.

FIG. 1 is a block diagram depicting an embodiment of a host device capable of communicating with an external network.

FIG. 2 is a flow chart illustrating an embodiment of a method of providing power to a network interface.

DETAILED DESCRIPTION

Figure 3:
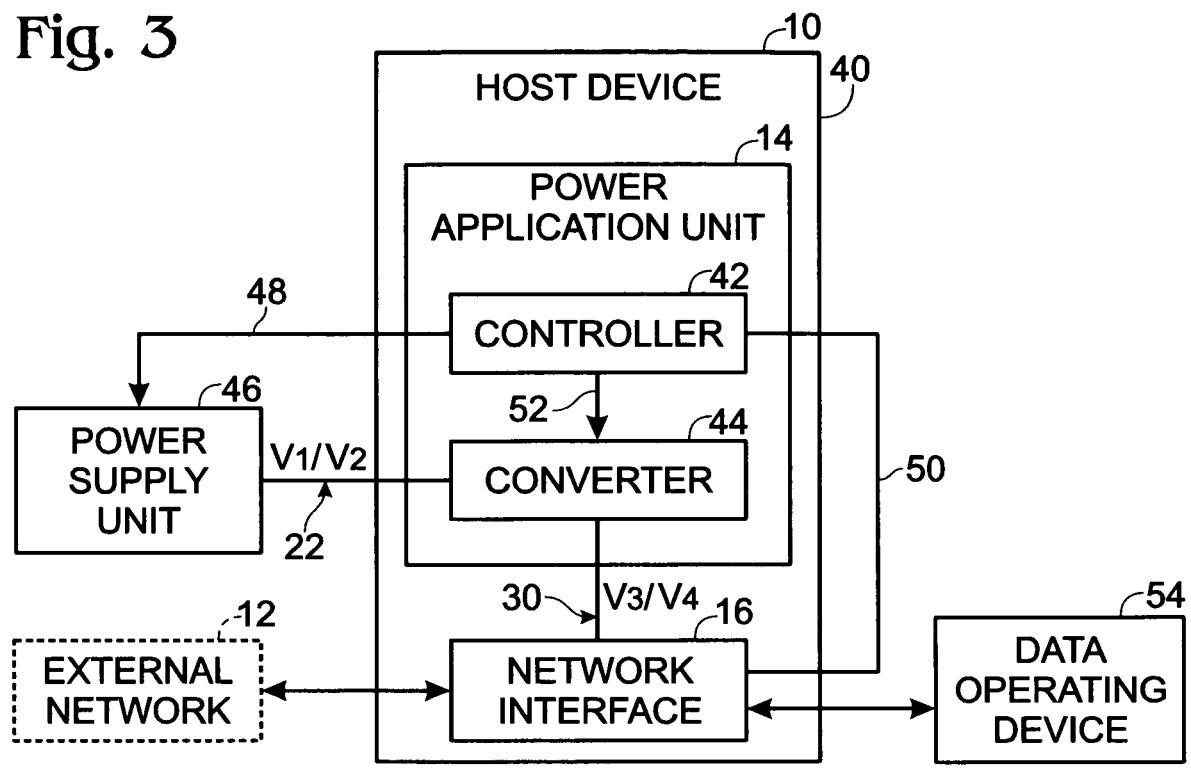
FIG. 3 is also a block diagram depicting an embodiment of a host device capable of communicating with an external network.

It is to be understood that the embodiments disclosed herein are not limited to the particular process and materials discussed herein, and as such, may vary to some degree. It is also to be understood that the terminology used herein is for the purpose of describing particular embodiments, and is not intended to be limiting, as the scope of an invention disclosed herein is defined by the appended claims and equivalents thereof.

Referring now to the drawings and more particularly to FIG. 1, there is illustrated a host device 10 that may be capable of communicating with an external data network 12. A host device may be any device that has functionality based on or that is independent of information such as data received from or transmitted to the external network. Such transmission or receipt of information may be referred to generally as communication. Exemplary host devices may include computers, personal computers, processor-based devices, computer peripheral devices, and network devices that communicate over the external network. Representative examples of computer peripheral devices include printers, scanners, facsimile machines or multifunction devices having a plurality of printing, scanning and facsimile communication functions.

A host device 10 may include a power-application unit 14 and a network interface 16. Power-application unit 14 may receive a first power-supply output having a first voltage level $V_1$ and a second power-supply output having a second voltage level $V_2$. The first and second power-supply outputs may be transmitted to the power-application unit on a first power-transmitting assembly 22. A power-transmitting assembly may be any device or assembly of devices suitable for providing power at the two voltage levels to the power-application unit. Examples of power-transmitting devices include electrical conductors, electromagnetic devices, or electric power transducers.

Power-application unit 14 may produce a first power-application output having a third voltage level $V_3$ from the first power-supply output and a second power-application output having a fourth voltage level $V_4$ from the second power-supply output.

Network interface 16 may transmit data to and receive data from external network 12. The network interface may communicate using wired or wireless communication, and may be powered at least in part by the first and second power-application outputs. The first and second power-application outputs may be transmitted to the network interface on a second power-transmitting assembly 30, which may be considered a power input for the network interface.

In one example of host device 10, the third voltage level $V_3$ may be substantially equal to the fourth voltage level $V_4$, in which case power is provided to network interface 16 at substantially the same voltage level for both power-supply outputs. In another example the third voltage level $V_3$ may be substantially equal to the second voltage level $V_2$, in which case the second power-supply output may be applied directly to the network interface.

It is seen that power-application unit 14 may be operable for providing power to network interface 16 according to a method 31 shown in the flow chart of FIG. 2. A first power-supply output having a first voltage level $V_1$ may be received at step 32. A second power-supply output having a second voltage level $V_2$ may be received at step 33. A course of action may be based on whether a first or second power-supply output is received, as indicated at step 34. A first power-application output having a third voltage level $V_3$ may be produced from the received first power-supply output at step 35. A second power-application output having a fourth voltage level $V_4$ may be produced from the received second power-supply output at step 36. The network interface may be powered with the first power-application output having the third voltage level $V_3$ when the first power-supply output having the first voltage level $V_1$ is received, and with the second power-application output having the fourth voltage level $V_4$ when the second power-supply output having the second voltage level $V_2$ is received, as indicated at step 37.

The second power-application output may be produced with the fourth voltage level $V_4$ equal to the second voltage level $V_2$, and/or equal to the third voltage level $V_3$.

Regarding FIG. 3, a host device 40 that may be made according to host device 10 is shown. In this description, reference numbers used with reference to features in an earlier figure are used on corresponding features in subsequent figures. Host device 40 may communicate with an external network 12, and may include a power-application unit 14 and a network interface 16. Power-application unit 14 may include a controller 42 and a power converter 44. A power-supply unit 46 may be controlled by a power-supply-control signal 48 produced by controller 42 to provide power to power-application unit 14, and in particular to power converter 44, via power-transmitting assembly 22. Controller 42 may also produce a power-application control signal 52 for controlling operation of converter 44. Further, controller 42 may be responsive to control signals received from other sources, such as a network-interface control signal 50, which may be a wake control signal.

Converter 44 may include any device suitable for converting a received power-supply output into a power-application output. Specifically, converter 44 may convert a power-supply output having voltage level $V_1$ into a power-application output having voltage level $V_3$ and convert a power-supply output having voltage level $V_2$ into a power-application output having a voltage level $V_4$. The power may be converted in response to power-application signal 52. Converters for producing a power output having one voltage level from a received power input having another voltage level are well known. The power output from converter 44 may be applied to network interface 16 via power-transmitting assembly 30.

Network interface 16 may receive from and transmit to an external network 12 data and other information. Such information may also be received from and transmitted to a data-operating device 54 that may be contained within host device 40 or may be external to it. A data-operating device may be any device that communicates such information, and may include other features or functions. In an example in which host device 40 is a printer for use with a separate computer system (not shown) connected to the external network, data-operating device 54 may be a digital controller for controlling operation of the various printing functions or it may be a device using data to produce a printed document.

Host device 40 and/or a system supported by the host device may have one or more sleep, standby, off or other reduced-power operating modes in addition to the usual or normal operating mode. During normal operation all features of host device 40 may operate. In this operating state controller 42 may produce a power-supply-control signal appropriate to cause the power-supply unit to produce a first power-supply output having the first voltage level $V_1$. In association with the power-supply output, controller 42 may produce a first power-application output having the third voltage level $V_3$.

During a period when there is no demand or reduced demand for one or more functions, it may be desirable to turn off or otherwise reduce the power consumed by the host device. These reduced-power modes may be controlled by controller 42—and thereby power-application unit 14—or by another controller that may provide control information to controller 42. For example, when operating in a normal operating mode and there has been a period during which a device has not been used, the operating system may go into a reduced-power mode and reduce power to some of the devices. For example, controller 42 may produce a power-supply-control signal 48 appropriate to cause the power-supply unit to produce a second power-supply output having the second voltage level $V_2$. In association with the power-supply output, controller 42 may produce power-application-control signal 52 appropriate to cause the converter to produce the second-power-application output having the fourth voltage level $V_4$. In this example, voltage level $V_1$ may be higher than voltage level $V_2$ and voltage level $V_3$ may be higher than voltage level $V_4$. Voltage level $V_3$ may be substantially the same as voltage level $V_4$ and/or voltage level $V_4$ may be substantially the same as voltage level $V_2$. In these latter two examples, power having substantially the same voltage level may be applied to the network interface in both normal and reduced-power modes.

A reduced-power mode may be established when no data has been received by network interface 16 for a set period of time. During such a reduced-power mode, network interface 16 may be configured to produce an appropriate network-interface-control signal 50 in response to receipt of data from the external network when the network interface is receiving the second-power-application output. Power-application unit 14, and controller 42 specifically, may be responsive to the network-interface control signal to produce a power-supply-control signal 48 appropriate for changing the power-supply output from the second power-supply output to the first power-supply output. It will be appreciated that in this example the network interface produces the network-interface control signal in response to receipt of data from the external network when the second power-supply output is powering the network interface. In response to the produced network-interface control signal, the controller may then control the power-supply unit to produce the first power-supply output. Additionally in this example, it will be appreciated that the controller controls the power-supply unit to produce alternatively the first and second power-supply outputs.

Figure 4:
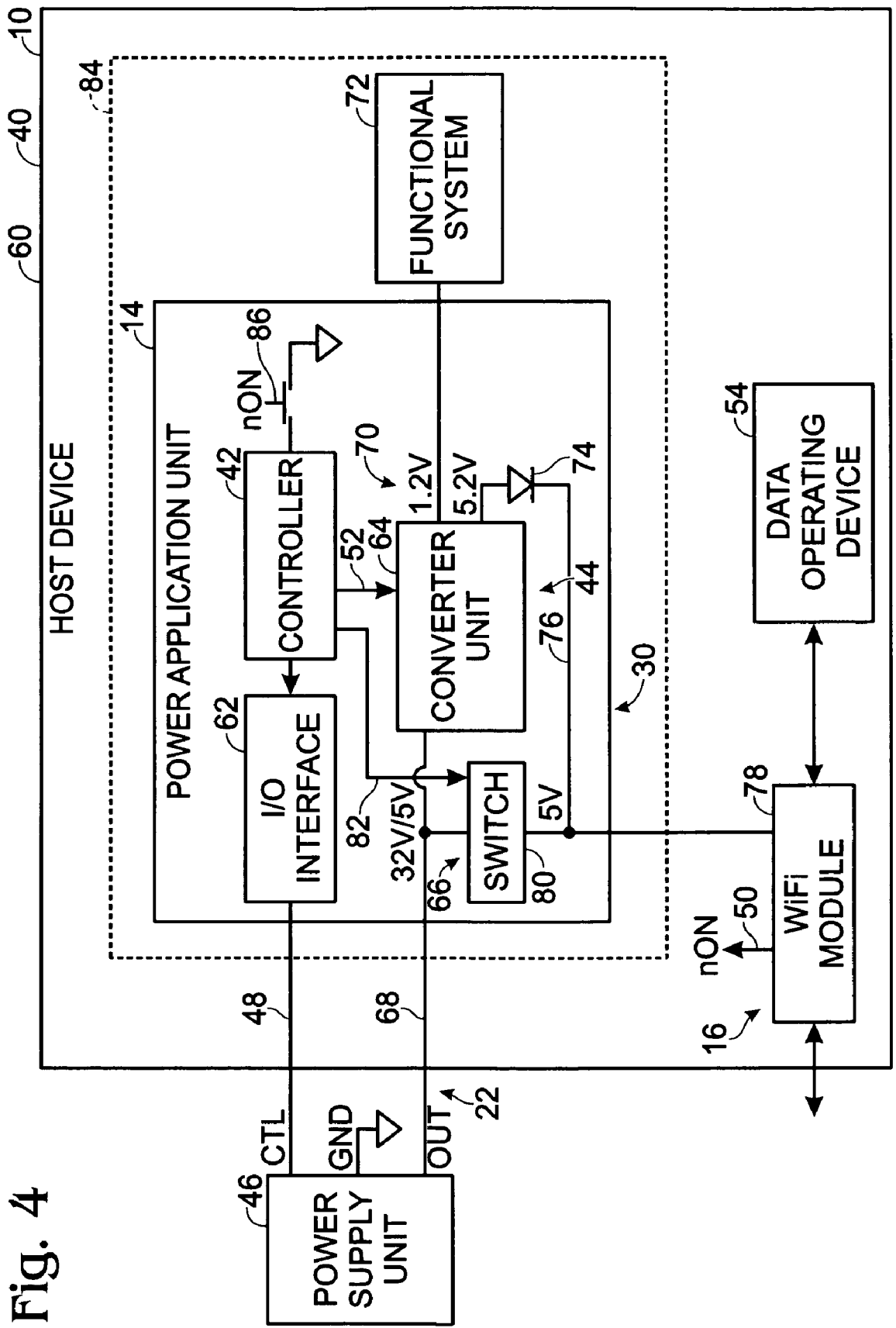
FIG. 4 is a block diagram depicting a further embodiment of a host device capable of communicating with an external network.

Regarding FIG. 4, an example of a host-device 10 or host-device 40 is shown as a host device 60. Host device 60 may include a power-application unit 14, including a controller 42 and a converter 44, and a network interface 16. The host device may include or be connected to a power-supply unit 46. Power-supply unit 46 may receive a control signal 48 from controller 42, such as through an input/output interface, such as a general purpose input/output device (GPIO) 62. The power-supply unit may be controllable to produce on power-transmitting assembly 22 the first power-supply output having a first voltage level $V_1$, which in this example may be 32 volts, and a second power-supply output having a second voltage level $V_2$, which may be 5 volts, for example.

Converter 44 may include a converter unit 64 and a bypass unit 66. Converter unit 64 may receive the power-supply outputs on a single conductor 68, although plural conductors or other power transmitting devices may be used for power-transmitting assembly 22. Converter unit 64, and thereby converter 44, may include any device or circuit suitable for converting received power at a first voltage level to an output power at the third voltage level. Converter unit 64 may produce from the received power-supply output a first operating-power output 70. Operating-power output 70 may be applied to any associated operating functional systems, such as a functional system 72, and may have any appropriate voltage level, such as 1.2 volts.

Converter unit 64 may also produce on power-transmitting assembly 30, the first power-application output. In the example illustrated, the first power-application output may have a voltage level $V_3$ substantially equal to 5 volts. This may be provided by applying a voltage of 5.2 volts to an in-line diode 74, such as a Schottky diode, connected in line to a conductor 76 connected to a network interface 16. In this example, network interface 16 may be in the form of a WiFi module 78 for communicating with the external network by wireless communication. In wireless WiFi networks, operating power is not transmitted wirelessly so power is provided by power-application unit 14.

Bypass unit 66 may be disposed directly between power-transmitting assemblies 22 and 30. Bypass unit 66 may be any device operable for selectively coupling the power received on power-transmitting assembly 22 to power-transmitting assembly 30. In this example, a switch 80 may be used between conductors 68 and 76, with the switch controllable by a bypass-control signal 82. Bypass control signal 82 may be produced by controller 42. For example, switch 80 may be a linear/pass switch or transistor.

It will be appreciated that in this example, the power-application unit 14 includes a first conductor 68 for receiving the power-supply outputs, a second conductor 76 for conducting the first power-application output to the network interface 16, a voltage converter unit 64 for converting the received first power-supply output to the first power-application output, and a bypass device 66 for bypassing the converter when the power-application unit receives the second power-supply output.

Also in this example, the first and second power-supply outputs are received on the first conductor 68 and the first and second power-application outputs are conducted on the second conductor 76. Additionally or alternatively, power-application unit 14 may include voltage converter unit 64 for converting the received power-supply output from the first voltage level to the third voltage level, and a bypass device 66 for bypassing the converter unit when the power-application unit receives the second power-supply output.

It is seen that the converter unit 64 may convert the received first power-supply output to the first power-application output, and the converter unit may be bypassed when the second power-supply output is received by the power-application unit. Further, the first and second power-supply outputs may be received on a first conductor 68, and the first and second power-application outputs may be produced on second conductor 76. It will also be appreciated that network interface 16 may be powered with the second power-supply output when the second power-supply output is received.

Host device 60 may be a personal printer or controller for a personal printer or other network communication device as has been described with reference to FIG. 1 with regard to host device 10. In an electronically controlled device, such as a printer, certain components may be mounted on a single circuit board 84. In this example, application unit 14 may be mounted on a circuit board along with one or more other components, such as functional system 72 and GPIO 62. For example, application unit 14, other than diode 74 and switch 80 may be formed as an analog application-specific integrated circuit (ASIC) and functional system 72 may be a printer digital controller in the form of a digital ASIC.

The use of wireless network links has increased dramatically with more PCs and hand held devices being used in the home and office. For those who do not have heavy printing needs, a reduced-power mode of operation known as Wake on Wireless LAN (WoW) may provide significant power savings. The main printer electronics may be shut down and host device 60 may be operated with reduced numbers of operating components. In some examples, WiFi module 78 may be powered while host device 60 is in a reduced-power mode such as a WoW mode, so that it can detect when an incoming data frame is received on the wireless LAN for an intended job.

FIG. 4 illustrates a WoW power scheme that may use power supply 46. During power "ON" or normal mode, the controller simply may float the power-supply control signal output from GPIO 62. Power-supply unit 46 may supply 32 volt power as the power-supply output to functional devices, such as the printer motor driver, as well as converter 44 (for converting DC to DC). The produced 5.2 volt first power-application output may provide power to WiFi module 78 through Schottky diode 74. Controller 42 may control linear/pass switch 80 to the WiFi module in an off state. Before the printer goes into a sleep mode, for example, switch 80 may be turned on, so power received on conductor 68 may be fed through conductor 76 to the WiFi module, maintaining the WiFi module in an operating state during switching between sleep or WoW and normal operating modes.

There may be a difference in operation between a sleep mode and a WoW mode. For example, power may still be provided to functional system 72 in sleep mode but not in WoW mode. Also, converter unit 64 may output a lower-voltage output to the WiFi module in sleep mode, and it may be switched off in WoW mode.

The printer may be commanded to reduce power after a given period of time during which the printer is idle. The power-supply unit may be controlled by grounding power-control signal 48, causing the power-supply unit 46 to reduce the output to 5 volts. The 5-volt power-supply output may be passed through switch 80 to power WiFi module 78. Meanwhile the power-application unit may be powered at a low level sufficient to monitor an ON button 86 (wake up command) from the WiFi module. A reduced-power sleep mode may also be provided by removal of power to the main digital system 72, and a single stage of power conversion (in the power-supply unit) may be used to supply the WiFi module.

In summary, host device 10 may be capable of communication with external network 12, the host device comprising network interface 16 for transmitting data to and receiving data from the external network over a wireless communication link, the network interface being configured for receiving power and having a reduced-power mode in which a wake or network-interface control signal is produced upon receipt of a communication over the wireless communication link. Power-supply unit 46 may be controllable for producing a power-supply output having selectively one of first and second voltage levels. Converter 44 may produce a second power-application output having substantially the second voltage level (the fourth voltage level $V_4$ equals the second voltage level $V_2$) when the power-supply output has the first voltage level, the power-application output being applied to the network interface. Switch 80 may have a closed state in which the second power-supply output is applied to the network interface and an open state in which the first power-supply output is not applied to the network interface, the switch being controllable for operating in the closed and open states. Controller 42 may be responsive to the network-interface control signal for controlling the power supply and the switch to cause the power-supply unit to produce the power-supply output with the first voltage level and the switch to operate in the open state when the network interface is not in the reduced-power mode, and to cause the power-supply unit to produce the power-supply output with the second voltage level and the switch to operate in the closed state when the host device is in the reduced-power mode, the network interface thereby receiving power having the second voltage level when the power-supply unit produces power having the first and second voltage levels.

Figure 5:
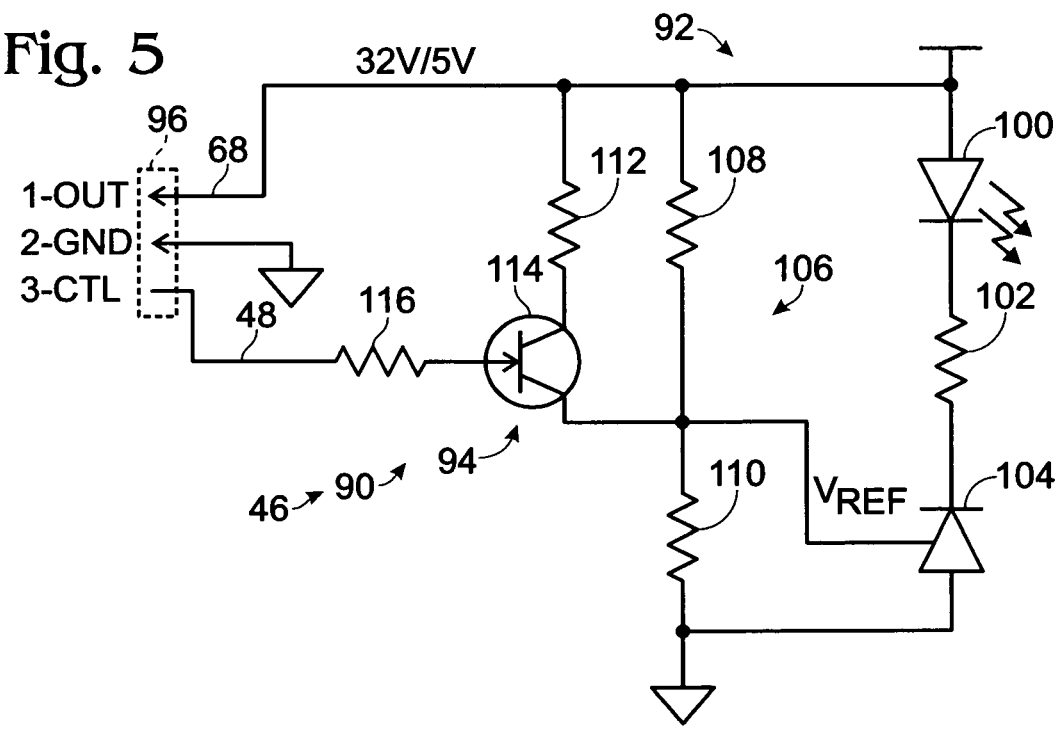
FIG. 5 is a schematic diagram of an embodiment of a portion of a secondary network of a power-supply unit.

Regarding FIG. 5, a power-supply unit 90 is illustrated that may be an example of power-supply unit 46. Power-supply unit 90 may include a conventional primary-to-secondary conversion circuit 92 for a flyback switching power supply, providing a transformer-rectified output on power-supplyoutput conductor 68. A secondary control circuit 94 may be connected to conversion circuit 92 for controlling the output of power-supply unit 90. A physical connector 96 or plug/receptacle may provide control and power communication between the power-supply unit and host devices 10, 40 and/or 60 in an example where the power-supply unit is not part of the host device. Power-supply unit 46 may also be part of the host device.

Conversion circuit 92 may end with a programmable shunt regulator circuit 98. Circuit 98 may include the combination of an opto-diode 100, a resistor 102 that in one example may have a value of 100 ohms, and a programmable shunt regulator 104 in series between conductor 68 and circuit ground. A voltage divider 106 also may extend between conductor 68 and ground, including a resistor 108 connected to conductor 68 and a resistor 110 connected to ground. The junction between resistors 108 and 110 may be connected to the reference terminal of the shunt regulator. The voltage on conductor 68 may generally be determined by the equation $V_{OUT}=(1+R(108)/R(110))V_{REF}$, where $V_{REF}$ is the voltage applied to the reference terminal of the shunt regulator.

A resistor 112 may be selectively connected in parallel with resistor 108 by a transistor 114. A further resistor 116 may be connected in series between conductor 48 and the base terminal of transistor 114. When transistor 114 is turned on by conductor 48 being held at ground potential by controller 42, resistor 112 may be in parallel with resistor 108 in voltage divider 106, thereby changing the output voltage on conductor 68 from the power-supply unit. The values of the resistors may be selected to provide the desired level of output voltage. To provide voltages of 32 volts and 5 volts as has been described, exemplary values for the resistors are as follows: resistor 108 (33,000 ohms), resistor 110 (2,780 ohms), resistor 112 (3,300 ohms), and resistor 116 (2,000 ohms). Other resistor values may also be used.

In some examples, power-supply unit 90 or 46 may be an AC-to-DC adapter that is connected to a host device by three-pin connector 96 that is then connected to a complementary connector in the host device. The DC output power may be applied to pin 1 for example, circuit ground may be applied to pin 2, and the power-supply control signal may be applied to pin 3, as shown.

Thus in this example, during normal operation, the control pin 3 may be left floating and the power-supply unit may apply 32 volts to the host device as usual. When the printer goes into sleep mode or off mode, controller 42 may shunt conductor 48 and control pin 3 to ground. This may turn transistor 114 on and change the resistances in voltage divider 106, thereby changing the power-supply output to 5 volts, which is sufficient to keep WiFi module 78 active (awake) while other electronic circuits may be off.

As a further benefit, when flyback power-supply unit 90 operates in a light load condition, it may be configured to go into a pulse skipping mode (PSM) to reduce the switching frequency. In this example, by reducing the output from a higher voltage such as 32 volts to a lower voltage such as 5 volts, the power-supply unit may be configured to go into a very deep PSM condition, resulting in reduced power consumption. Other forms of power supply that provide power at selectable output voltage levels may also be used.

Accordingly, while inventions defined in the following claims have been particularly shown and described with reference to the foregoing embodiments, those skilled in the art will understand that many variations may be made therein without departing from the spirit and scope of the inventions. Other combinations and subcombinations of features, functions, elements and/or properties may be claimed through amendment of the present claims or presentation of new claims in this or a related application. The foregoing embodiments are illustrative, and no single feature or element is essential to all possible combinations that may be claimed in this or later applications. Where the claims recite "a" or "a first" element or the equivalent thereof, such claims should be understood to include one or more such elements, neither requiring nor excluding two or more such elements.

What is claimed is:

1. A host device capable of communicating with an external network, the host device comprising:
a power-application unit for receiving a first power-supply output having a first voltage level and a second power-supply output having a second voltage level, the power-application unit producing a first power-application output having a third voltage level from the first power-supply output and a second power-application output having a fourth voltage level from the second power-supply output, and
a network interface for transmitting data to and receiving data from an external network, the network interface being powered at least in part by the first and second power-application outputs,
wherein the power-application unit further includes a voltage converter for converting the received first power-supply output to the first power-application output, and
wherein the power-application unit includes a bypass device for bypassing the converter when the power-application unit receives the second power-supply output.

2. The host device of claim 1, wherein the third voltage level is substantially equal to the fourth voltage level.

3. The host device of claim 2, wherein the power-application unit further includes a first conductor for receiving the second power-supply output, and a second conductor for conducting the first power-application output to the network interface.

4. The host device of claim 3, wherein the first power-supply output is also received on the first conductor and the second power-application output is also conducted on the second conductor.

5. The host device of claim 1, wherein the third voltage level is substantially equal to the second voltage level.

6. The host device of claim 1, wherein the network interface is configured to produce a network-interface control signal in response to receipt of data from the external network when the network interface is receiving power from the bypass device, and the power-application unit is responsive to the network-interface control signal to produce a power-supply-control signal appropriate for changing the power-supply output from the second power-supply output to the first power-supply output.

7. A host device capable of communication with an external network, the host device comprising:
a network interface for transmitting data to and receiving data from an external network over a wireless communication link, the network interface being configured for receiving power and having a reduced-power mode in which a network-interface control signal is produced upon receipt of a communication over the wireless communication link;
a power-supply unit controllable for producing a power-supply output having selectively one of first and second voltage levels;
a converter for producing a power-application output having substantially the second voltage level when the power-supply output has the first voltage level, the power-application output being applied to the network interface;

a switch having a closed state in which the power-supply output is applied to the network interface and an open state in which the power-supply output is not applied to the network-interface, the switch being controllable for operating in the closed and open states; and a controller responsive to the network-interface control signal for controlling the power supply and the switch to cause the power-supply unit to produce the power-supply output with the first voltage level and the switch to operate in the open state when the network interface is not in the reduced-power mode, and to cause the power-supply unit to produce the power-supply output with the second voltage level and the switch to operate in the closed state when the network interface is not in the reduced-power mode, the network interface thereby receiving power having the second voltage level when the power-supply unit produces power having the first and second voltage levels.

8. A method of applying power to a network interface, the method comprising:

receiving a first power-supply output having a first voltage level;

receiving a second power-supply output having a second voltage level;

producing from the received first power-supply output a first power-application output having a third voltage level;

producing from the received second power-supply output a second power-application output having a fourth voltage level;

powering the network interface with the first power-application output when the first power-supply output is received; and powering the network interface with the second power-application output when the second power-supply output is received, wherein producing the first power-application output includes converting with a converter the received first power-supply output to the first power-application output, wherein producing the second power-application output includes producing the second power-application output with the fourth voltage level equal to the third voltage level, and wherein producing the second power-application output includes bypassing the converter when the second power-supply output is received.

9. The method of claim 8, wherein receiving the first and second power-supply outputs includes receiving the first and second power-supply outputs on a first conductor, and producing the first and second power-application outputs includes producing the first and second power-application outputs on a second conductor.

10. The method of claim 8, wherein producing the first power-application output includes producing the first power-application output with the third voltage level substantially equal to the second voltage level.

11. The method of claim 8, wherein the first and second power-supply outputs are produced by a controllable power-supply unit, the method further comprising controlling the power-supply unit to produce alternatively the first and second power-supply outputs.

12. A method of applying power to a network interface, the method comprising:

receiving a first power-supply output having a first voltage level;

receiving a second power-supply output having a second voltage level;

producing from the received first power-supply output a first power-application output having a third voltage level;

producing from the received second power-supply output a second power-application output having a fourth voltage level;

powering the network interface with the first power-application output when the first power-supply output is received;

powering the network interface with the second power-application output when the second power-supply output is received;

wherein producing the second power-application output includes powering the network interface with the second power-supply output when the second power-supply output is received;

wherein the first and second power-supply outputs are produced by a controllable power-supply unit, the method further comprising controlling the power-supply unit to produce alternatively the first and second power-supply outputs; and producing by the network interface a network-interface control signal in response to receipt of data from the external network when the second power-supply output is powering the network interface, and in response to the produced network-interface control signal, controlling the power-supply unit to produce the first power-supply output.

* * * * *